United States Patent Office 2,953,458
Patented Sept. 20, 1960

2,953,458
PROCESS FOR MODIFYING POWDERED MILK PRODUCTS

Arjen Sjollema, Leeuwarden, Netherlands, assignor to Cooperatieve Vereniging tot Bereiding van Melkproducten, trading under the style Cooperatieve Condensfabriek "Friesland," Leeuwarden, Netherlands No Drawing. Filed Apr. 29, 1958, Ser. No. 731,625

Claims priority, application Netherlands Mar. 11, 1958

3 Claims. (Cl. 99—56)

This invention relates to a process for modifying powdered milk products so that they more easily disperse in water. It is well known that powdered milk products such as spray dried whole milk or skim milk when stirred with the adequate quantity of cold water are apt to float on top of the water and to form lumps which are wetted on the outside but remain dry on the inside. It requires vigorous beating to subdivide these lumps into particles small enough to be completely wetted and to sink into the water.

When the water is heated to 50° centigrade before contacting it with milk powder, the powder disperses much more easily, but this is not sufficient, as in practical use it is often required to dissolve milk powder or other powdered milk products in unheated tap water or even in chilled water.

This problem has been recently studied in various laboratories and the name "instant" powder has been coined to indicate powders that quickly disperse in cold water.

A known method to impart "instant" dispersibility to a spray dried milk powder is to moisten it with 10 to 20% of added water and to redry the powder to the original water content of 3 to 5%. This method causes the powder particles to aggregate and at the same time causes the lactose to crystallize. Both processes probably contribute to the "instant" property of this powder. A disadvantage of this method is, that the proteins are denatured. Further the method is not applicable to whole milk powder since wetting and redrying causes the butter to de-emulsify, which on the one side makes the powder water repellent and on the other side causes churning of the butter fat in the reconstituted milk. In another known process a soluble gas such as $N_2O$ or $CO_2$ is incorporated in the liquid milk product, which is then dried under vacuum and expanded tremendously by the liberation of the dissolved gas. This process yields a powder which is very bulky and fragile and cannot conveniently be handled. Moreover its "instant" quality is slight.

In still another known method a surfactant is added to the milk before spray drying. The wettability attained in this process is moderate and there is still some churning.

The present invention imparts excellent "instant" quality to any common powdered milk product made by spray drying, vacuum roller drying or vacuum tray drying. It is both applicable to skim powders and to powders containing butter fat. It requires no special measures or additions before or during drying and no redrying of the finished powder.

The invention comprises mixing anhydrous liquefied lecithin or oleic acid in a rotary mixer with the powdered milk product in an amount of 0.2 to 4% by weight of the milk product. No vigorous movement is required, because the anhydrous liquefied surfactant, owing to its capillary activity, spreads over the surface of the particles; a gentle movement of the rotating propeller during 5 to 15 minutes is sufficient to intimately mix the compounds.

It is essential for the invention that the surface active agent is both anhydrous and is liquefied before mixing. This will now be explained in full.

If the lecithin or oleic acid contains water, the water would be taken up by the powdered milk product, causing the following harmful effects:

(1) The powder would get sticky and would have to be redried, (2) The lactose would crystallize, causing the fat, if any, to de-emulsify.

(3) The surfactant would penetrate into the particles and would no longer form a continuous coating around them.

If on the other hand, the lecithin or oleic acid were solid, it would not spread over the surface of the powder particles and thus remain ineffective. It is not necessary (though acceptable), that the surface active agent is liquid as such, it is sufficient if it has been liquefied before mixing it with the powdered milk product. This can be done in various ways:

(1) The surface active agent is melted by heating and the milk product is also heated to above the melting temperature of the surfactant. Then the warm compounds are mixed and the product is allowed to cool down.

(2) The surface active agent is dissolved in a volatile organic solvent; this solution is applied to the milk product which is then heated or evacuated or both in order to evaporate the solvent.

If the surface active agent is applied correctly according to either of the above procedures, it forms a continuous layer or film around the milk product particles and this layer induces "instant" dispersibility by acting in two ways: it retards the penetration of water into the powder and it accelerates wetting of the powder. The net result is that the powder particles are wetted before a viscous or gelatinous aqueous layer around the lumps of milk products has been formed. Consequently, the air between the particles in the lumps is displaced by water and this enables the lumps to sink below the surface and to disperse into separate particles.

The invention is illustrated by the following examples, all of which use surfactants, which are harmless for human consumption.

Example 1

Skim milk powder made by vacuum roller drying is mixed with 1% oleic acid at room temperature. The powder shows excellent "instant"-dispersibility which is preserved even after one year of storage.

Example 2

Spray dried milk powder is heated to 70° centigrade in a steam-jacketed rotary mixer. Soya-lecithin is heated to 70° C. in a separate vessel and mixed with the milk powder in an amount of 2% by weight. After 5 minutes of mixing the powder is transferred to a drum which is then evacuated and in which the powder is cooled down. The finished product shows excellent "instant" action in cold water. The "instant" action is preserved even after one year of storage, provided the powder is kept free from moisture.

Example 3

A baby food is prepared by vacuum tray-drying at 50° C. of a mixture of whole milk and dextrin-maltose with small quantities of vitamins and minerals. The finished product contains 20% of milk fat, 50% of milk solids-non-fat and 26% of dextrin-maltose. It is mixed at room temperature with 1% of a solution consisting of 1 part of egg lecithin and 4 parts of petroleum ether. After mixing, the powder is again placed in the vacuum-oven for half an hour in order to evaporate the petroleum ether. The treated product can be easily mixed with cold or tepid water, whereas the untreated powder only dissolves rapidly if the water has a temperature of 50° C. or more.

What I claim is:

1. The method of making milk product particles easily dispersible in water, which comprises the step of coating the milk product particles with an anhydrous, liquid surface active agent selected from the group consisting of lecithin and oleic acid, in an amount of 0.2% to 4%, by weight, of the milk product.

2. The method of making milk product particles easily dispersible in water, which comprises heating lecithin to a temperature above its melting point to liquefy the same, heating the milk product particles to the same temperature, and mixing the heated milk product particles with the liquefied lecithin in an amount of 0.2% to 4%, by weight, of the milk product whereby the milk product particles are coated with lecithin.

3. The method of making milk product particles easily dispersible in water, which comprises dissolving lecithin in a volatile organic solvent, mixing the lecithin solution with the milk product particles at room temperature in an amount of 0.2% to 4% of lecithin, by weight of the milk product, and subsequently evaporating the solvent whereby the milk product particles are coated with lecithin.

References Cited in the file of this patent

UNITED STATES PATENTS

| | | |
|---|---|---|
| 1,202,130 | Vasey | Oct. 24, 1916 |
| 1,808,730 | Bornegg | June 2, 1931 |
| 1,937,527 | Otting | Dec. 5, 1933 |
| 2,399,565 | North et al. | Apr. 30, 1946 |
| 2,524,291 | Hoffman | Oct. 3, 1950 |
| 2,611,708 | Owens et al. | Sept. 23, 1952 |
| 2,819,971 | Gunthardt | Jan. 14, 1958 |

FOREIGN PATENTS

| | | |
|---|---|---|
| 297,256 | Great Britain | Sept. 20, 1928 |

Disclaimer

2,953,458.—*Arjen Sjollema*, Leeuwarden, Netherlands. PROCESS FOR MODIFYING POWDERED MILK PRODUCTS. Patent dated Sept. 20, 1960. Disclaimer filed July 9, 1965, by the assignee, *Cooperatieve Vereniging tot Bereiding van Melkproducten, trading under the style Cooperatieve Condensfabriek "Friesland."*

Hereby enters this disclaimer to claim 3 of said patent.
[*Official Gazette August 24, 1965.*]